United States Patent
Maeda (10) Patent No.: US 7,277,146 B2
(45) Date of Patent: Oct. 2, 2007

(54) VERTICAL ALIGNMENT MODE LCD WITH LARGER DIELECTRIC PROTRUSIONS IN TRANSMISSIVE REGION THAN IN REFLECTION REGION

(75) Inventor: Tsuyoshi Maeda, Ryuo-cho (JP)

(73) Assignee: Seiko Epson Corporation, Tokyo (JP)

( * ) Notice: Subject to any disclaimer, the term of this patent is extended or adjusted under 35 U.S.C. 154(b) by 29 days.

(21) Appl. No.: 10/842,423

(22) Filed: May 11, 2004

(65) Prior Publication Data

US 2005/0030453 A1    Feb. 10, 2005

(30) Foreign Application Priority Data

Jun. 6, 2003   (JP)   ............... 2003-162355
Feb. 6, 2004   (JP)   ............... 2004-031056

(51) Int. Cl.
*G02F 1/1337*   (2006.01)

(52) U.S. Cl. ...................... 349/129; 349/114

(58) Field of Classification Search ........ 349/143–144, 349/113–114, 107–109, 106, 129
See application file for complete search history.

(56) References Cited

U.S. PATENT DOCUMENTS

| | | | | |
|---|---|---|---|---|
| 5,185,232 A * | 2/1993 | Sasaoka | ...................... | 430/264 |
| 5,815,232 A * | 9/1998 | Miyazaki et al. | ............ | 349/155 |
| 6,552,767 B1 * | 4/2003 | Kaneko | ...................... | 349/119 |
| 6,710,825 B2 * | 3/2004 | Kubo et al. | .................... | 349/48 |
| 6,710,827 B2 * | 3/2004 | Kubo et al. | .................... | 349/55 |
| 6,906,768 B1 * | 6/2005 | Kim et al. | ................... | 349/129 |
| 2001/0005245 A1 * | 6/2001 | Sakamoto et al. | .......... | 349/106 |
| 2001/0024257 A1 * | 9/2001 | Kubo et al. | .................... | 349/138 |
| 2001/0030726 A1 * | 10/2001 | Yoshida et al. | ............. | 349/117 |
| 2001/0033353 A1 * | 10/2001 | Shimoshikiryo | ............ | 349/129 |
| 2002/0085152 A1 * | 7/2002 | Chuang et al. | ............. | 349/123 |
| 2002/0149728 A1 * | 10/2002 | Ogishima et al. | ........... | 349/129 |
| 2002/0158288 A1 * | 10/2002 | Yamazaki et al. | .......... | 257/343 |
| 2003/0076463 A1 | 4/2003 | Ozawa et al. | | |
| 2004/0165129 A1 | 8/2004 | Okumura | | |

FOREIGN PATENT DOCUMENTS

| | | |
|---|---|---|
| CN | 1211745 A | 3/1999 |
| EP | 0884626 | 12/1998 |
| JP | A-10-039318 | 2/1998 |
| JP | A 11-242226 | 9/1999 |

(Continued)

*Primary Examiner*—Andrew Schechter
*Assistant Examiner*—Phu Vu
(74) *Attorney, Agent, or Firm*—Oliff & Berridge, PLC (57) ABSTRACT

The invention provides a liquid crystal display device having a wide viewing angle for transmissive display and reflective display. The liquid crystal display device according to the invention can include a homeotropic liquid crystal layer interposed between a pair of substrates. The liquid crystal display device has a transmissive display area and a reflective display area in each dot area. A liquid crystal layer thickness-adjustment layer can be interposed between at least the substrate of the pair of substrates and the liquid crystal layer. The liquid crystal layer thickness-adjustment layer reduces the liquid crystal layer thickness of the reflective display area in comparison with the liquid crystal layer thickness of the transmissive display area. On the substrate opposing the substrate with the liquid crystal layer thickness-adjustment layer, protrusions protruding from the inner surface of the substrate to the liquid crystal layer are formed.

12 Claims, 10 Drawing Sheets

FOREIGN PATENT DOCUMENTS

| | | |
|---|---|---|
| JP | A-11-248921 | 9/1999 |
| JP | A-2000-267081 | 9/2000 |
| JP | A 2002-350853 | 12/2002 |
| JP | A-2003-131205 | 5/2003 |
| KR | 10-2004-0055666 | 6/2004 |

* cited by examiner

VERTICAL ALIGNMENT MODE LCD WITH LARGER DIELECTRIC PROTRUSIONS IN TRANSMISSIVE REGION THAN IN REFLECTION REGION

BACKGROUND OF THE INVENTION

1. Field of Invention

The present invention relates to a liquid crystal device and an electronic apparatus. More specifically, the invention relates to a technology for obtaining a wider viewing angle for the liquid crystal display device using homeotropic liquid crystal.

2. Description of Related Art

A liquid crystal device having a reflective mode and a transmissive mode is known as a transreflective liquid crystal device. Such a transreflective liquid crystal device has a liquid crystal layer interposed between an upper substrate and a lower substrate. A reflective film having a window for transmitting light through the film, composed of a metal plate, e.g., an aluminum plate, is disposed on the inner surface of the lower substrate. The reflective film functions as a transreflective plate. In such a case, in the reflective mode, the light entering from the upper substrate is transmitted through the liquid crystal layer and, then, is reflected at the reflective film on the inner surface of the lower substrate. The light passes through the liquid crystal layer again and is emitted out from the upper substrate to be used for displaying an image. In the transmissive mode, the light from the backlight enters from the lower substrate and passes through the window on the reflective film and then through the liquid crystal layer. Subsequently, the light is emitted to the outside from the upper substrate to be used for displaying an image.

Consequently, the area on the reflective film where the window is formed functions as a transmissive display area and the other areas functions as a reflective display area.

Known transreflective liquid crystal devices have a problem in which the viewing angle is small in transmissive display. This is because only one polarization plate disposed on the viewer's side can be used for reflective display because a transreflective plate is disposed on the inner surface of the liquid crystal cell to prevent parallax, causing the flexibility in the optical design of the device to become small. To solve this problem, Jisaki et al. proposed, in "Development of transreflective LCD for high contrast and wide viewing angle by using homeotropic alignment," M. Jisaki et al., Asia Display/IDW'01, p. 133-136 (2001), a new liquid crystal display device using homeotropic liquid crystal. This new liquid crystal display device has three characteristics:

1) operating in a vertical alignment mode wherein liquid crystal molecules having negative dielectric anisotropy are aligned vertically relative to a substrate and, then, are tilted by applying a voltage;

2) having a multi-gap structure wherein the thickness of the liquid crystal layer (cell gap) in the transmissive display area and in the reflective display area differ (for example, refer to Japanese Unexamined Patent Application Publication No. 11-242226);

3) having a multi-domain structure wherein the transmissive display area is shaped as a regular octagon with a projection formed in the center of the regular octagon on the opposing substrate so that the liquid crystal molecules tilt in eight different directions within the transmissive display area.

See also, generally, Japanese Unexamined Patent Application Publication No. 2002-350853.

SUMMARY OF THE INVENTION

Incorporating a multi-gap structure described above in a transreflective liquid crystal display device is extremely effective for balancing the electro-optical characteristics (transmittance-voltage characteristic and reflectance-voltage characteristic) in the transmissive display area and in the reflective display area. This is because, in the transmissive display area, light passes through the liquid crystal layer only once but, in the reflective display area, light passes through the liquid crystal layer twice.

However, a great difference is created in the distance between the substrates of a liquid crystal display device having a multi-gap structure and having projections for controlling the direction of tilt of the liquid crystal molecules. This is a problem because it is difficult to form projections on the substrates where the distance between the substrates differ and it is difficult to control the height of these projections. Not being able to form the projections with a predetermined height may cause a problem in that the direction of tilt of liquid crystal molecules cannot be controlled.

The object of the invention is to provide a liquid crystal display device enabling display with a wide viewing angle by solving the above-mentioned problems by providing a transreflective liquid crystal display device using homeotropic liquid crystal in which the direction of tilt of the liquid crystal molecules can be controlled easily and accurately. Another object of the invention is to provide a simply-structured transreflective liquid crystal display device using homeotropic liquid crystal. In this way, the manufacturing efficiency of the liquid crystal display device is improved and the reliability is increased in that the number of possible defects is reduced. Another object of the invention is to provide a highly reliable electronic apparatus including the liquid crystal display device.

In order to achieve the above-mentioned object, a liquid crystal display device according to the invention can include a liquid crystal layer interposed between an upper and a lower substrate and a dot area including both a transmissive display area and a reflective display area. The liquid crystal layer is composed of liquid crystal that is vertically aligned at an initial alignment state and has negative dielectric anisotropy. Interposed between at least the lower substrate and the liquid crystal layer is a liquid crystal layer thickness-adjustment layer for reducing the thickness of the liquid crystal layer in the reflective display area in comparison with the thickness of the liquid crystal layer in the transmissive display area. On the upper substrate without the liquid crystal layer thickness-adjustment layer, protrusions protruding from the inner surface of the substrate to the liquid crystal layer are formed. In the invention, the inner surface of the substrate refers to the surface of the substrate adjacent to the liquid crystal layer. Moreover, the protrusions protruding from the surface of the substrate refers to protrusions protruding from the inner surface of the liquid crystal layer thickness-adjustment layer when there is a liquid crystal layer thickness-adjustment layer formed on the inner surface of the substrate.

As described above, the liquid crystal display device according to the invention is a transreflective liquid crystal display using homeotropic liquid crystal. Furthermore, the liquid crystal display device has the liquid crystal layer thickness-adjustment layer for substantially equalizing the retardation in the reflective display area and the transmissive display area. In other words, the liquid crystal display device has a multi-gap structure. In this way, the alignment direction of the liquid crystal molecules is controlled effectively.

More specifically, a homeotropic liquid crystal display device tilts the liquid crystal molecules, which are vertically aligned at an initial alignment state, with respect to the substrate surface by applying an electrical field. Without inducing a pre-tilt, the turning direction of the liquid crystal molecules cannot be controlled. Thus, disarrangement (disclination) of the alignment of the liquid crystal molecules occurs, causing a failure in display such as leakage of light. As a result, the quality of the display can be reduced. Thus, in a homeotropic liquid crystal, it is important to control the alignment direction of the liquid crystal molecules when an electric field is applied.

In the liquid crystal display device according to the invention, the protrusions protruding from the inner surface of the substrate into the liquid crystal layer are formed to control the alignment direction of the liquid crystal molecules. Due to this structure, the liquid crystal molecules are vertically aligned at an initial alignment state and have a pre-tilt according to the shape of the protrusions. As a result, the direction of tilt of the liquid crystal molecules can be restricted or controlled. In this way, disarrangement (disclination) of the alignment of the liquid crystal molecules hardly occur and failures of display such as leakage of light can be prevented. Consequently, failures of display such as residual images and smear-like unevenness are suppressed, and a liquid crystal display device with a wide viewing angle is provided.

Since in the liquid crystal display device according to the invention has a multi-gap structure, the liquid crystal layer thickness of the transmissive display area is greater than that of the reflective display area. For this reason, the electro-optical characteristics (transmittance-voltage characteristic and reflectance-voltage characteristic) in the transmissive display area and the reflective display area are balanced.

Since the protrusions are formed on the substrate without the liquid crystal layer thickness-adjustment layer for the multi-gap structure, the formation of the protrusions and the setting of the height of the protrusions are easy. More specifically, since the liquid crystal layer thickness-adjustment layer on the substrate obviously causes a difference in the distance between the substrates (which forms the multi-gap structure), it is extremely difficult to form protrusions where there is a difference in the distance between the substrate. In other words, it is difficult to form the protrusions on the substrate where the distance between the substrates is small. Also the height of the protrusions may differ depending on whether they are formed on the substrate where the distance between the substrate is large or small. Contrarily, by adopting the structure of the invention, the protrusions can be formed on a relatively flat surface. Accordingly, the above-mentioned problems do not occur and the protrusions can be formed extremely easily. Moreover, the setting of the height of the protrusions is also extremely easy.

The protrusions of the liquid crystal display device according to the invention function as a device for controlling the alignment of the liquid crystal molecules. The protrusions have inclined surfaces having a slope of a predetermined angle with respect to the inner surface of the substrate. The inclined surfaces of the protrusions enable control of the direction of the liquid crystal molecules in which they tilt along the inclined surface. The protrusions can be formed on dot areas, which are display areas. The protrusions are preferably formed on the transmissive display area instead of the reflective display area.

Electrodes for driving the liquid crystal are formed on the inner surface of the upper and lower substrates. The protrusions are formed on at least the electrodes on the inner surface of the upper substrate. In this case, an alignment film for vertically aligning the liquid crystal molecules is disposed on the inner surfaces of the protrusions and/or the electrodes. On each outer surface of the upper and lower substrates, circular polarization plates for emitting circularly polarized light into the liquid crystal layer may be disposed. As the circular polarization plates, a combination of a polarization layer and a retardation layer may be used.

The liquid crystal display device according to the invention includes the upper substrate and the lower substrate. On the outer surface of the lower substrate, a backlight for transmissive display is disposed. On the inner surface of the lower substrate, a reflective layer is disposed selectively in the reflective display area. In this case, the light from the backlight entering from the lower substrate is used for the transmissive display, and the outside light such as lighting or sunlight entering from the upper substrate is reflected at the reflective layer and used for the reflective display.

On the lower substrate with the liquid crystal layer thickness-adjustment layer, a color filter layer may be disposed. The color filter layer may be composed of a plurality of color layers in which the color layers are stacked on the areas between the dots. In this case, the stacked color layers are capable of displaying the color black. Thus, the stacked color layer can be used as a black matrix in the areas between the dots. Accordingly, it is unnecessary to form another black matrix, and the structure of the liquid crystal display device becomes simple and the production efficiency is improved.

On the inner surface of the color filter layer, the liquid crystal layer thickness-adjustment layer is disposed so that it covers the area with stacked color layers. The upper substrate without the color filter layer and the liquid crystal layer thickness-adjustment layer has second protrusions protruding from the inner surface of the substrate to the liquid crystal layer formed on at least the area opposing the area with the stacked color layers. In this case, the second protrusions function as substitutes of spaces or, in other words, as substitutes of the device for controlling the thickness of the liquid crystal layer (the distance between the substrates, i.e., the cell gap). The area with the stacked color layers protrudes into the liquid crystal layer more than the other areas by the thickness of the stack of color layers. Therefore, when the second protrusions are formed at least on the area opposing the stacked color layers, the thickness of the liquid crystal layer is minimized in the area with the second protrusions. Consequently, the second protrusions can be used as the device for controlling the thickness of the liquid crystal layer.

The second protrusions are preferably formed in a same process as the above-mentioned protrusions (which are hereinafter referred to as the first protrusions) for controlling the direction of tilt of the liquid crystal molecules in order to improve the production efficiency. In this case, the first and the second protrusions formed in the transmissive display area and/or the reflective display area are composed of the same material. Moreover, the second protrusions have a substantially identical height as the first protrusions formed in the transmissive display area and/or the reflective display area. Since the first and the second protrusions in the transmissive display area and/or the reflective display area have a substantially identical height, the first protrusions are prevented from contacting the opposing substrate. Thus, the alignment of the liquid crystal molecules is sufficiently controlled.

An electronic apparatus according to the invention can include the above-mentioned liquid crystal display device. Such an electronic apparatus has both a transmissive mode and a reflective mode. The electronic apparatus has a display capable of displaying images with a wide viewing angle in both modes.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Embodiments according to the invention are described below by referring to drawings. The sizes of the layers and parts depicted in the drawings do not represent the actual proportions since the sizes are altered so that the layers and parts are viewable in the drawings.

A liquid crystal display device according to this embodiment described below is an embodiment of an active matrix liquid crystal display device using a thin-film diode (TFD) as a switching element and, in particular, is a transreflective liquid crystal display device enabling reflective display and transmissive display.

Figure 1:
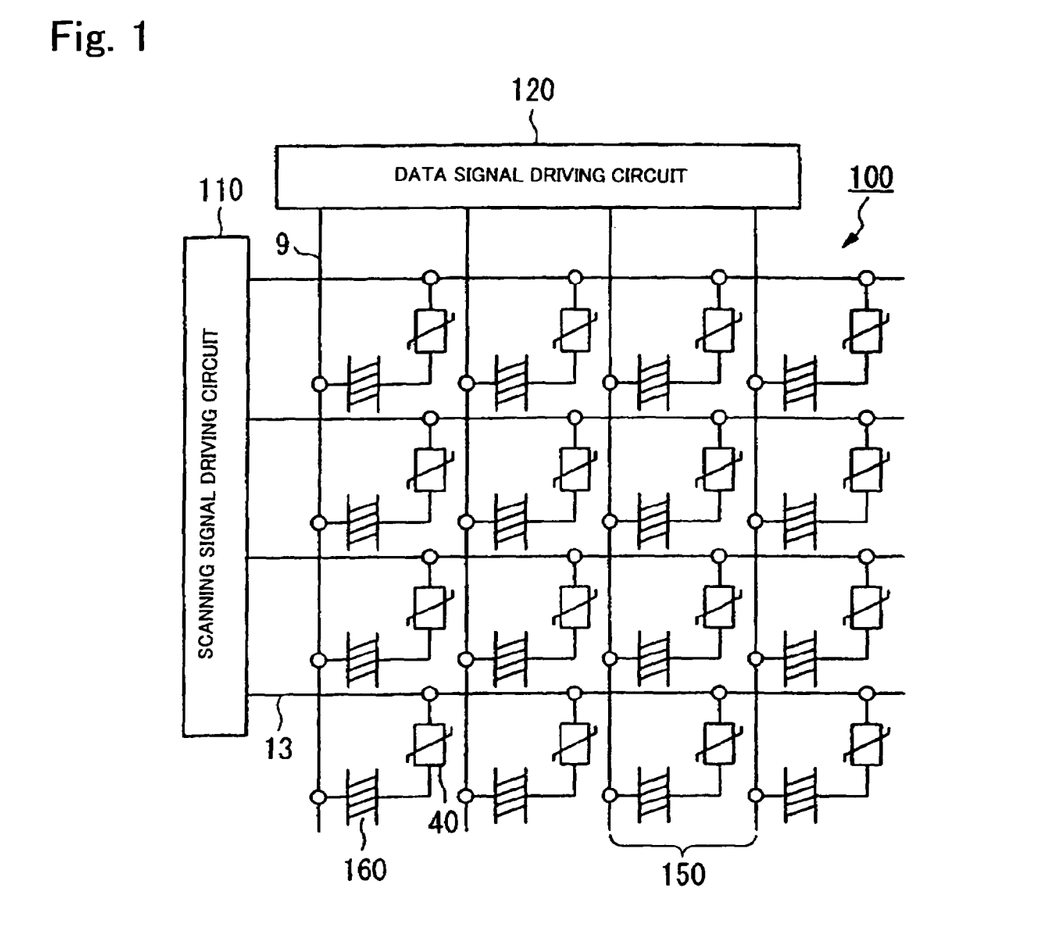
FIG. 1 is an equivalent circuit diagram of a liquid crystal display device according to a first embodiment of the present invention.

FIG. 1 is an equivalent circuit diagram of a liquid crystal display device 100 according to this embodiment. The liquid crystal display device 100 includes a scanning signal driving circuit 110 and a data signal driving circuit 120. The liquid crystal display device 100 has signal lines, i.e., a plurality of scanning lines 13 and a plurality of data lines 9 that intersect with the scanning lines 13. The scanning lines 13 are driven by the scanning signal driving circuit 110 and the data lines 9 are driven by the data signal driving circuit 120. In each pixel area 150, a TFD element 40 and a liquid crystal display element 160 (liquid crystal layer) is serially connected between a scanning line 13 and a data line 9. In FIG. 1, the TFD element 40 is connected to the scanning line 13 and the liquid crystal display element 160 is connected to the data line 9. Contrarily, the TFD element 40 may be connected to the data line 9 and the liquid crystal display element 160 may be connected to the scanning line 13.

Figure 2:
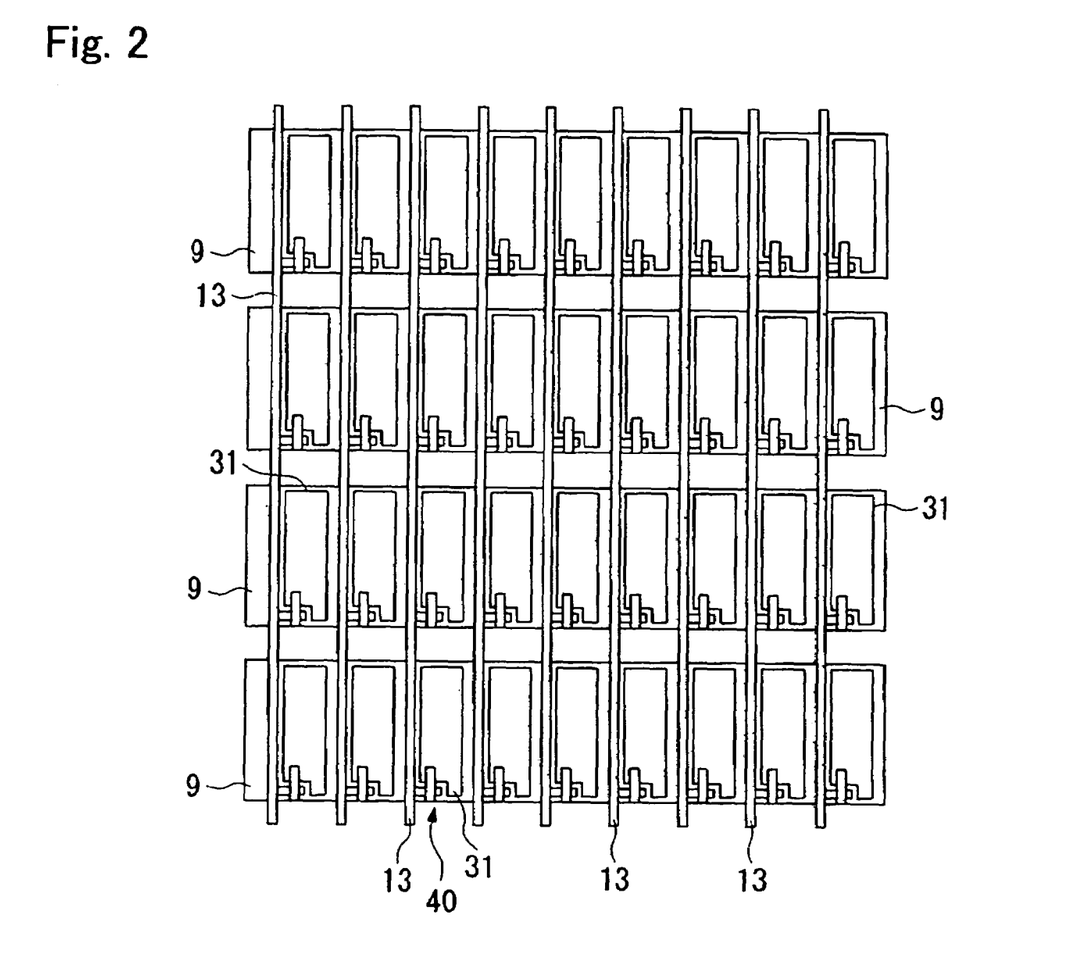
FIG. 2 is a plan view of electrodes of a liquid crystal display device illustrated in FIG. 1.

By referring to FIG. 2, the planar structure of electrodes included in the liquid crystal display device according to this embodiment is described. As shown in FIG. 2, the liquid crystal display device according to this embodiment has pixel electrodes 31, which are rectangular in the plan view, arranged in a matrix and connected to the scanning lines 13 via the TFD elements 40. Common electrodes 9 are arranged in a stripe pattern perpendicular to the pixel electrodes 31 and the vertical direction of the drawing. The common electrodes 9 are composed of the data lines arranged in a stripe pattern intersecting with the scanning lines 13. In this embodiment, each area with a pixel electrode 31 forms a dot area. Each of the dot areas arranged in a matrix are activated.

The TFD element 40 is a switching element connecting the scanning line 13 and the pixel electrode 31. The TFD element 40 has a MIM structure including a first conductive film essentially composed of Ta, an insulating film essentially composed of Ta2O3 and disposed on the surface of the first conductive film, and a second conductive film essentially composed of Cr and disposed on the surface of the insulating film. The first conductive film of the TFD element 40 is connected to the scanning line 13, and the second conductive film is connected to the pixel electrode 31.

Figure 3A:
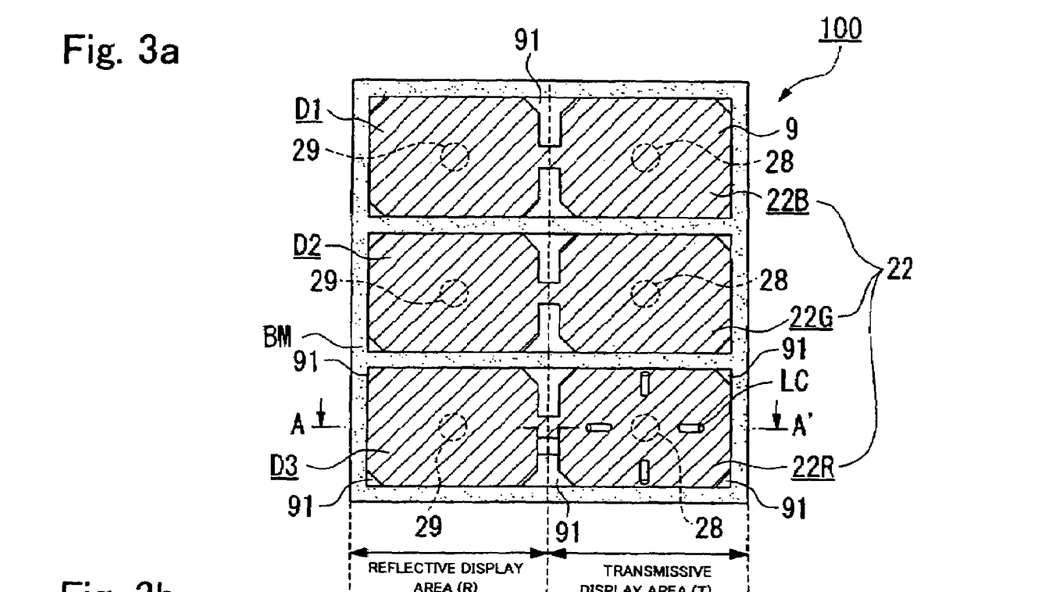
FIG. 3A is an enlarged plan view of main parts of the liquid crystal display device illustrated in FIG. 1.
Figure 3B:
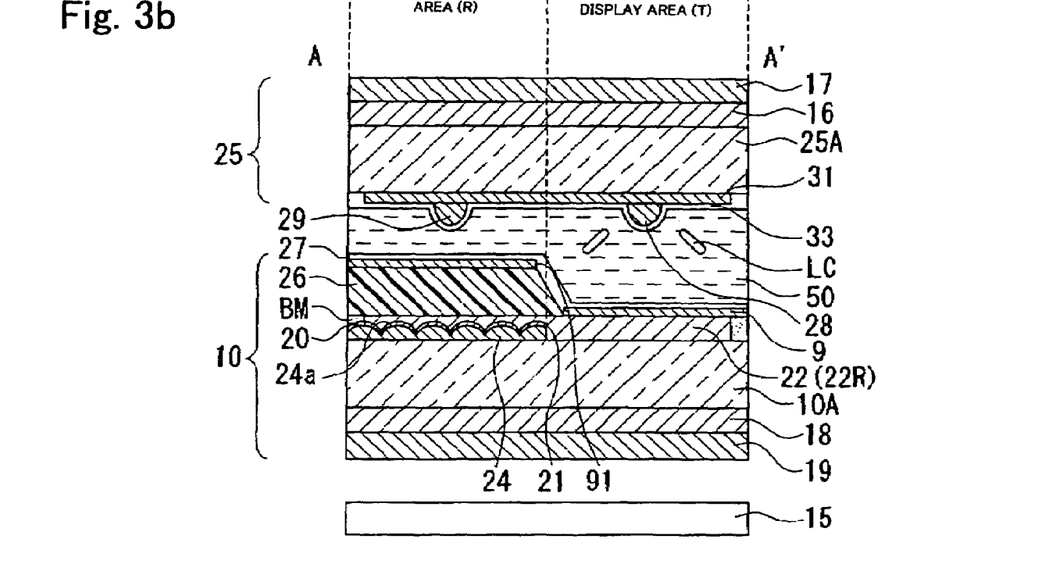
FIG. 3B is a cross-sectional view of main parts of the liquid crystal display device illustrated in FIG. 1.

The pixel structure of the liquid crystal display device 100 according to this embodiment is described by referring to FIG. 3. FIG. 3(a) illustrates the pixel structure of the liquid crystal display device 100. In particular, the drawing illustrates the planar structure of the pixel electrodes 31. FIG. 3(b) is a cross-sectional view taken along line A-A' of FIG. 3(a). The liquid crystal display device 100 according to this embodiment has dot areas including pixel electrodes 31 inside the area surrounded by the data lines 9 and the scanning lines 13, as shown in FIG. 2. As shown in FIG. 3(a), each dot area has a color layer that corresponds to one of the three primary colors. The three dot areas D1, D2, and D3 each form a pixel including a blue color layer 22B, a green color layer 22G, and a red color layer 22R.

As shown in FIG. 3(b), the liquid crystal display device 100 according to this embodiment can include a liquid crystal layer 50 interposed between an upper substrate (element substrate) 25 and a lower substrate (opposing substrate) 10. The liquid crystal layer 50 is composed of liquid crystal having molecules that are vertically aligned at an initial alignment state and have negative dielectric anisotropy.

A part of the lower substrate 10 includes an insulating film 24 interposed between a substrate body 10A composed of a transparent material, such as quartz or glass, and a reflective film 20 composed of a metal, such as silver with a high reflectance. The area with the reflective film 20 is a reflective display area R. The area without the reflective film 20, i.e., the area where an opening 21 is formed on the reflective film 20, is a transmissive display area T. The liquid crystal display device 100 according to this embodiment is a homeotropic liquid crystal display device having a homeotropic liquid crystal layer 50. Moreover, it is a transreflective liquid crystal display device capable of reflective display and transmissive display.

The insulating film 24 disposed on the substrate body 10A has a bumpy surface 24a. Accordingly, the surface of the reflective film 20 attached to the bumpy surface 24a is also bumpy. The reflected light is dispersed by the bumpy surface of the reflective film 20. In this way, light from outside is prevented from forming reflections in the reflective display and a wide viewing angle is obtained.

A color filter 22 (the red color layer 22R in FIG. 3(b)) is disposed across the reflective film 20 in the reflective display area R and on the substrate body 10A in the transmissive display area T. The periphery of the red color layer 22R is surrounded by a black matrix BM composed of chromium metal. The black matrix BM forms the borders of the dot areas D1, D2, and D3 (cf. FIG. 3(a)).

On the color filter 22, an insulating film 26 can be formed on the position corresponding to the reflective display area R. More specifically, the insulating film 26 is formed selectively above the reflective film 20 with the color filter 22 interposed therebetween. Because of the insulating film 26, the thickness of the liquid crystal layer 50 differs in the reflective display area R and the transmissive display area T. The insulating film 26 is composed of, for example, an organic acrylic resin film with a thickness of about 0.5 to 2.5 mm. The insulating film 26 has an inclined surface, in order that the film thickness gradually changes, on the border of the reflective display area R and the transmissive display area T. The thickness of the liquid crystal layer 50, without any insulating film 26 is about 1 to 5 mm. The thickness of the liquid crystal layer 50 in the reflective display area R is about half the thickness of the liquid crystal layer 50 in the transmissive display area T.

The insulating film 26 functions as a liquid crystal layer thickness-adjustment layer (liquid crystal layer thickness-controlling layer) for varying the thickness of the liquid crystal layer 50 in the reflective display area R and the transmissive display area T. In this embodiment, the edge of the flat surface of the upper surface of the insulating film 26 and the edge of the reflective film 20 (reflective display area) substantially match. Thus, the inclined surface is partly or entirely included in the transmissive display area T.

On the surface of the lower substrate 10 including the surface of the insulating film 26, common electrodes 9 composed of indium tin oxide (ITO) are disposed. On the common electrodes 9, an alignment film 27 composed of polyimide is disposed. The alignment film 27 functions as a homeotropic alignment film for aligning the liquid crystal molecules vertically relative to the film surface. Alignment processing, such as rubbing is not performed on the alignment film 27. In FIG. 3, the common electrodes 9 are formed in a stripe pattern in which the stripes extend in the longitudinal direction of the drawing. Each of the common electrodes 9 are used for each of the dot areas arranged in a row in the longitudinal direction of the drawing. The common electrodes 9 have slits 91 formed by cutting off parts of the common electrodes 9. In this embodiment, the reflective film 20 and the common electrodes 9 are formed separately before they are stacked. In the reflective display area R, however, the reflective film composed of a metal film may be used as part of the common electrodes.

In the upper substrate 25, a matrix of the pixel electrodes 31 composed of an ITO transparent conductive film is disposed on the inner surface (adjacent to the liquid crystal layer) of the substrate body 25A composed of a transparent material such as glass or quartz. On the pixel electrodes 31, protrusions 28 and 29 composed of a dielectric material are formed. More specifically, the protrusions 28 and 29 are formed on the inner surface (adjacent to the liquid crystal layer) of the pixel electrodes 31 in the transmissive display area T and the reflective display area R, respectively. Moreover, on the pixel electrodes 31 including the protrusions 28 and 29, a homeotropic alignment film 33, similar to the one on the lower substrate 10 composed of polyimide, is disposed.

The outer surface (not adjacent to the liquid crystal layer 50) of the lower substrate 10 has a retardation plate 18 and a polarization plate 19. Also, the outer surface of the upper substrate 25 has a retardation plate 16 and a polarization plate 17. In this way, circularly-polarized light enters the inner surface (adjacent to the liquid crystal layer 50) of the substrate. The combinations of the retardation plate 18 and the polarization plate 19, and the retardation plate 16 and the polarization plate 17 each function as a circularly-polarization plate. The polarization plate 17 (19) transmits only linearly-polarized light polarized in a predetermined direction. The retardation plate 16 (18) can be a $\lambda/4$ retardation plate. On the outer surface of the polarization plate 19 on the lower substrate 10, a backlight 15 is formed as a light source for transmissive display.

In the liquid crystal display device 100 according to this embodiment, the protrusions 28 and 29 composed of dielectric material can be formed on the inner surface (adjacent to the liquid crystal layer) of the electrode. The protrusions 28 and 29 can control the alignment of the liquid crystal molecules of the liquid crystal layer 50 or, in other words, can control the direction of tilt of the liquid crystal molecules vertically aligned at an initial alignment state when a voltage is applied to the electrodes. In FIG. 3, on the inner surface (adjacent to the liquid crystal layer) of the pixel electrodes 31 disposed on the inner surface of the upper substrate 25, the protrusions 28 and 29 are formed on the transmissive display area T and the reflective display area R, respectively.

Each protrusion 28 and 29 is a generally circular cone or a polygonal pyramid protruding from the inner surface of the upper substrate 25 (main surface of the electrodes) to the inner part of the liquid crystal layer 50. The protrusions 28 and 29 have an inclined surface (including a mildly curved surface) having a slope of a predetermined angle with respect to the inner surface of the substrate (the main surface of the electrode) for controlling the direction of tilt of the liquid crystal molecules LC along the inclined surface.

The common electrodes 9 disposed on the inner surface of the lower substrate 10 have slits 91 formed by cutting off parts of the common electrodes 9. These slits 91 generate a distorted electric field between the electrodes 9 and 31 in the area where the slits are formed. According to the distorted electric field, the direction of tilt of the liquid crystal molecules vertically aligned at an initial alignment state when a voltage is applied is controlled. As shown in FIG. 3(a), the slits 91 of the common electrodes 9 surround the protrusions 28 and 29 formed on the pixel electrodes 31. As a result, the direction of tilt of the liquid crystal molecules LC are controlled so that the liquid crystal molecules are arranged in a radial pattern around the protrusions 28 and 29.

The liquid crystal display device 100 described above have the advantages described below.

In general, when a voltage is applied to liquid crystal molecules having negative dielectric anisotropy aligned on an unrubbed homeotropic alignment film, since the direction of the liquid crystal molecules is not controlled, the liquid crystal molecules tilt in random directions and, thus, the molecules fail to align. In this embodiment, however, the protrusions 28 and 29 are formed on the inner surface of the pixel electrodes 31 and, in addition, the slits 91 are formed to planarly surround the common electrodes 9. In this way, the direction of tilt of the liquid crystal molecules vertically arranged at an initial alignment state are controlled by the inclined surface of the protrusions 28 and 29 and/or by the distorted electric field generated by the slits 91. Consequently, disclination due to alignment failure of the liquid crystal molecules is prevented. In this way, a high quality image, which does not have any residual images caused by disclination and smear-like unevenness that appear when viewed from an oblique direction, can be obtained.

The liquid crystal display device 100 has a multi-gap structure since the reflective display area R is formed on the insulating film 26. More specifically, the thickness of the liquid crystal layer 50 in the reflective display area R is substantially half the thickness of the liquid crystal layer 50 in the transmissive display area T. In this way, the retardation of the reflective display is substantially equal to the retardation of the transmissive display. As a result, the contrast of the display can be improved.

Since the protrusions 28 and 29 are formed on the upper substrate 25 and not on the lower substrate 10 having the insulating film 26 making up the multi-gap structure, forming the protrusions 28 and 29 and setting their height is easy.

In other words, the surface of the lower substrate 10 adjacent to the liquid crystal layer 50 including the insulating film 26 has a difference in thickness, which forms the multi-gap structure. Forming the protrusions 28 and 29 on the portion where the thickness is small is extremely difficult. This difference in thickness may cause a difference in height of the protrusions 28 and 29, which are each formed on a portion with different thicknesses. Contrarily, as in this embodiment, by forming the protrusions 28 and 29 on the substrate without the insulating film 26, the protrusions 28 and 29 can be formed on a relatively flat surface. In this way, the above-mentioned problems concerning the formation of the protrusions 28 and 29 do not occur. Thus, the protrusions 28 and 29 can be formed extremely easily and their height can be set extremely easily.

Figure 4A:
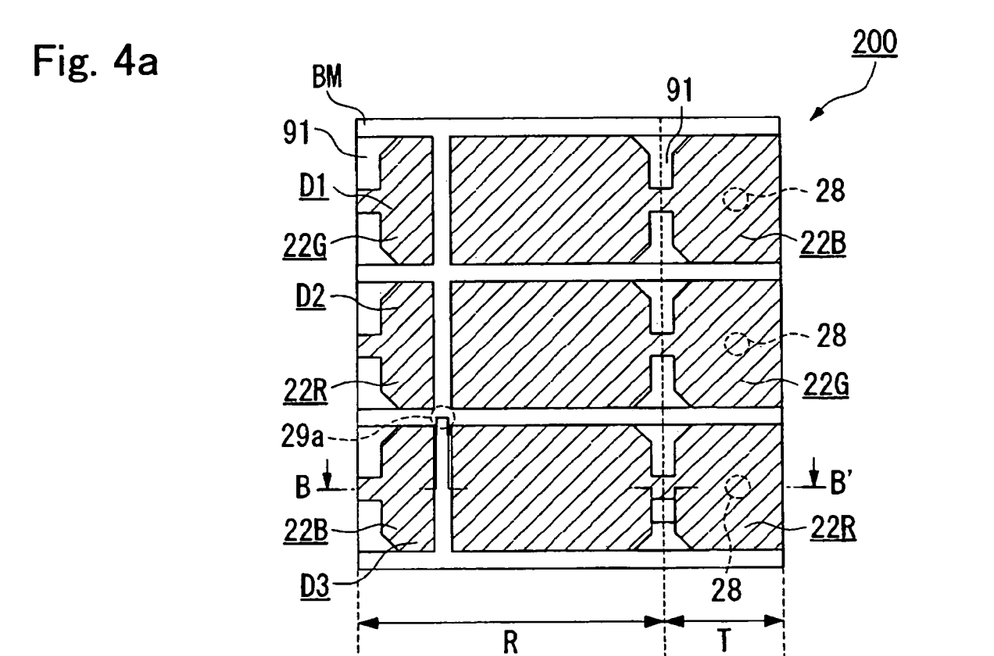
FIG. 4A is an enlarged plan view of main parts of a variation of a liquid crystal display device according to a first embodiment.
Figure 4B:
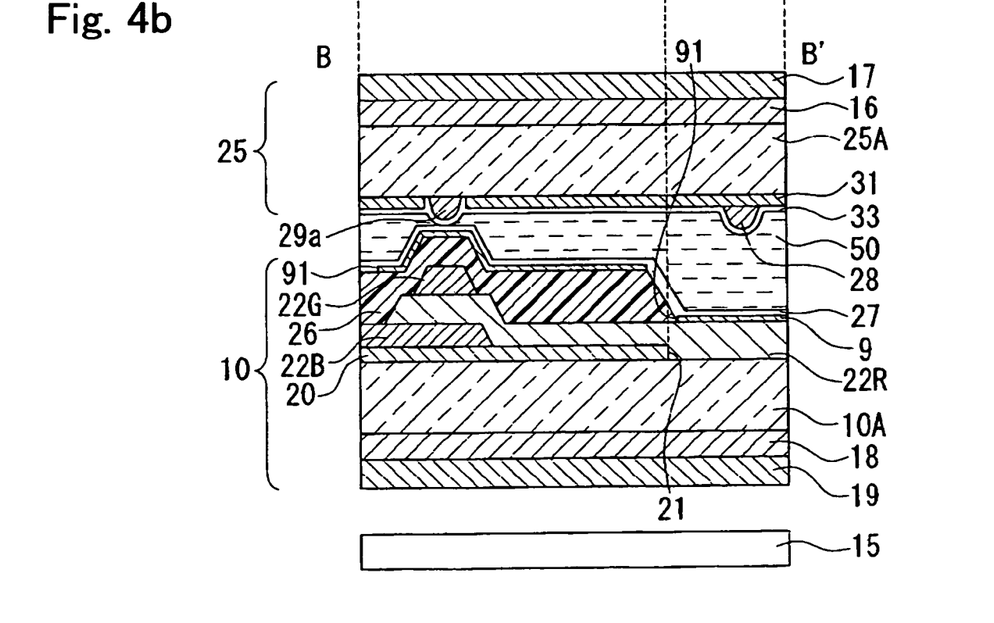
FIG. 4B is a cross-sectional view of main parts of a variation of a liquid crystal display device according to a first embodiment.
Figure 4C:
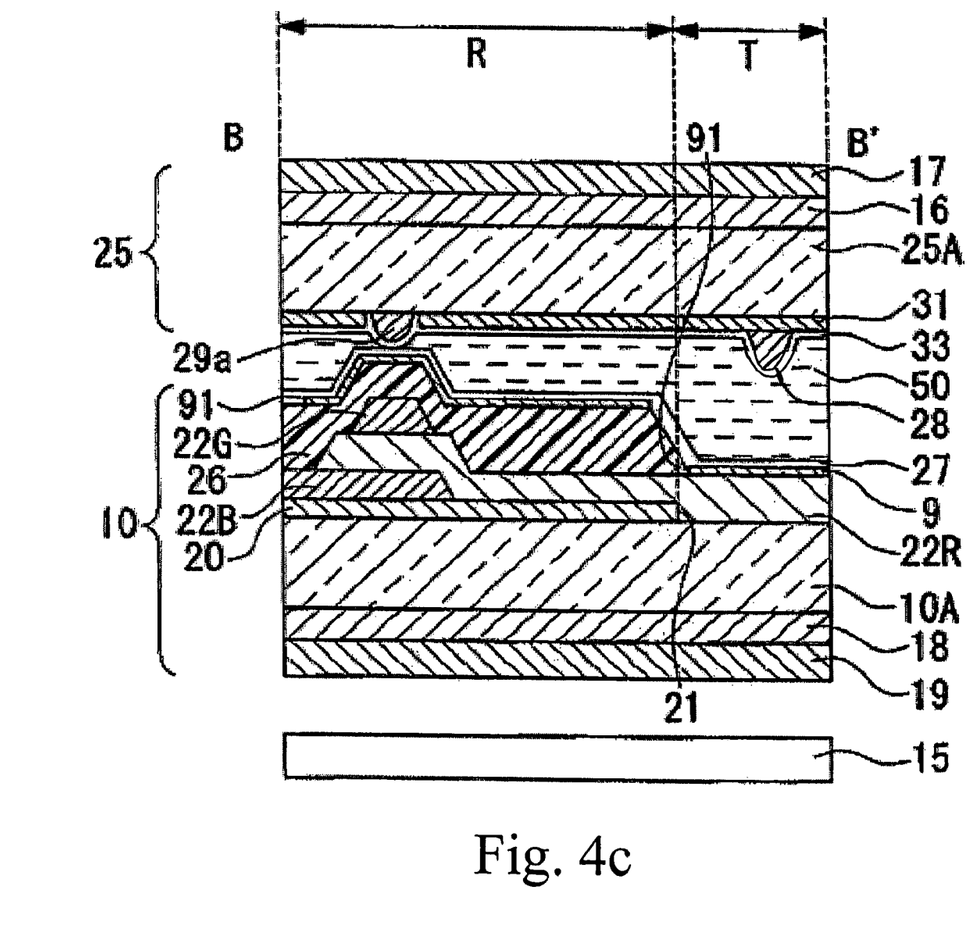
FIG. 4C is a cross-sectional view of main parts of a variation of a liquid crystal display device with protrusions relatively larger in the transmissive display area than the reflective area.

As shown in FIG. 4c, the protrusion 28 on the transmissive display area T can be formed so that the height is relatively larger than the height of the protrusion 29. Since the thickness of the liquid crystal layer of the transmissive display area T is relatively larger than that of the reflective display area R due to the multi-gap structure, in the transmissive display area T, the alignment of the liquid crystal molecules must be controlled with even greater force. Therefore, it is desirable to set the height of the protrusions as described above.

A liquid crystal display device 200 according to a second embodiment is described below by referring to a drawing. FIG. 4 illustrates a liquid crystal display device 200 according to a second embodiment wherein FIG. 4(a) is a plane view and FIG. 4(b) is cross-sectional view. FIG. 4 is equivalent to FIG. 3 illustrating the first embodiment. The basic structure of the liquid crystal display device 200 according to the second embodiment is substantially the same as the liquid crystal display device 100 illustrated in FIG. 3 except that the structure of the color filter differs. Therefore, for the parts in FIG. 4 that are indicated by the same reference numerals that were used in FIG. 3 are the same as those in FIG. 3 unless otherwise specified and their descriptions are omitted.

The liquid crystal display device 200 according to the second embodiment is an active matrix transreflective liquid crystal display device including a TFD as a switching element. The liquid crystal display device 200 includes a liquid crystal layer 50 interposed between an upper substrate (element substrate) 25 and a lower substrate (opposing substrate) 10. The liquid crystal layer 50 is composed of a liquid crystal having molecules that are vertically aligned at an initial alignment state and have negative dielectric anisotropy.

A part of the lower substrate 10 includes a substrate body 10A composed of a transparent material, such as quartz or glass, and a reflective film 20 composed of a metal, such as aluminum and silver, with a high reflectance. The reflective film 20 is formed in a predetermined pattern or, in other words, formed selectively on a reflective display area R. The lower substrate 10 also has a bumpy surface similar to the structure of the first embodiment formed of an insulating film 24 interposed between the substrate body and the reflective film.

On the reflective film 20 selectively formed on the reflective display area R and on the substrate body 10A of the transmissive display area T, a color filter 22 (22R, 22G, and 22B) is disposed across the reflective display area R and the transmissive display area T. The color filter 22 includes color layers 22R, 22G, and 22B that are red, green, and blue, respectively. The color layers 22R, 22G, and 22B make up dot areas D1, D2, and D3, respectively (cf. FIG. 4(a)).

In this embodiment, a black matrix BM forming the borders of the dot areas D1, D2, and D3 is not composed of the generally-used chromium metal, but instead is composed of a stack of the color layers 22R, 22G, and 22B. More specifically, the color layers 22R, 22G, and 22B are stacked in the areas between dots adjacent to the reflective display area R. The stacked layers display a black color. As a result of stacking the color layers, the thickness of the color filter 22 in the areas between dots becomes larger.

Covering the stacked color layers 22R, 22G, and 22B in the color filter 22 is an insulating film 26 functioning as a liquid crystal layer thickness-adjustment layer disposed across the reflective display area R. On the surface of the lower substrate 10 including the surface of the insulating film 26, common electrodes 9 composed of ITO are disposed. On the common electrodes 9, a homeotropic alignment film 27 composed of polyimide is disposed. As a result of stacking the color layers 22R, 22G, and 22B, as described above, the color filter 22 protrudes into the liquid crystal layer 50 by the thickness of the stack of color layers. The insulating film 26 disposed on the color filter 22 also has protrusions having the same shape as the color filter 22. The common electrode 9 has slits 91 formed by cutting off portions of the electrodes.

In the upper substrate 25, on the inner surface of the substrate body 25A composed of a transparent material, such as glass or quartz, a matrix pixel electrodes 31 composed of transparent conductive film such as ITO and an alignment film 33 composed of a material such as polyimide having a homeotropic alignment as same as the lower substrate 10 are disposed. Similar to the first embodiment, the pixel electrodes 31 in the transmissive display area T has protrusions 28 protruding from the inner surface of the electrode to the liquid crystal layer 50. Also, in the area between dots, protrusions 29a protrude from the inner surface of the substrate body 25A to the liquid crystal layer 50 in the area corresponding to the area where the insulating film 26 protrudes. The protrusions 29a are formed of the same material as the protrusion 28 in the transmissive display area T and have substantially the same height as the protrusions 28.

In the liquid crystal display device 200 according to the invention, the protrusions 29a protrude from the substrate body 25A in the upper substrate 25 to the liquid crystal layer 50 and oppose the area defined by disposing the insulating film 26 on stacked color layers 22R, 22G, 22B in the lower substrate 10. The protrusions 29a function to control the thickness of the liquid crystal layer 50 (in place of spacers). More specifically, the area with the stacked color layers 22R, 22G, 22B protrudes from the other areas to the liquid crystal layer 50 by the thickness of the stack of color layers. The insulating film 26 is disposed on the stacked color layers. The thickness of the liquid crystal layer in the area provided with the protrusions 29a is almost zero. As a result, the protrusions 29a can define the thickness of the liquid crystal layer. Thus, the thickness of the liquid crystal layer can be maintained uniformly on the surface without disposing spacers. The protrusions 29 are formed by the same process as the protrusions 28 formed on the transmissive display area T for improving the efficiency of production. The protrusions 29a have the same height as the protrusions 28.

In addition to the advantages of the liquid crystal display device 100 according to the first embodiment, the liquid crystal display device 200 described above has the advantages of improved production efficiency and reduced production costs since the black matrix BM is formed without using chromium metal. Moreover, the problem of environmental destruction caused by disposition of chromium metal can be prevented. Furthermore, since the thickness of the liquid crystal layer can be controlled without using spacers, the production efficiency can be improved and production costs can be reduced. In the lower substrate 10, in addition to the insulating film 26, color layers 22R, 22G, 22B are stacked. Therefore, the difference in the thickness of the lower substrate 10 becomes greater. By forming protrusions 28 and 29a on the upper substrate 25 such as described in this embodiment the production efficiency and the setting of the height of the protrusions becomes even easier.

Figure 5A:
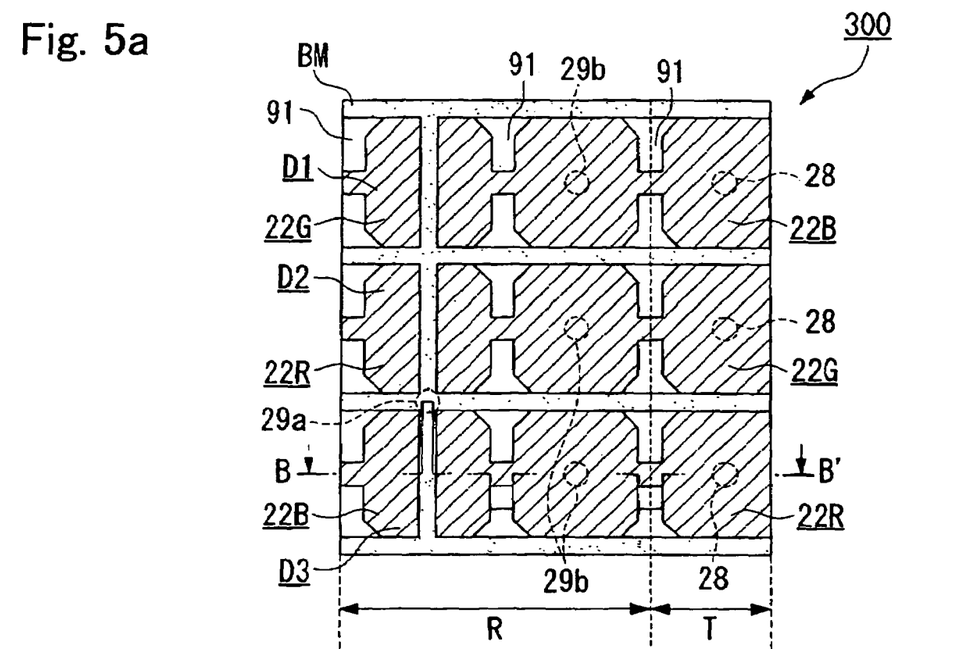
FIG. 5A is an enlarged plan view of main parts of a liquid crystal display device according to a second embodiment.
Figure 5B:
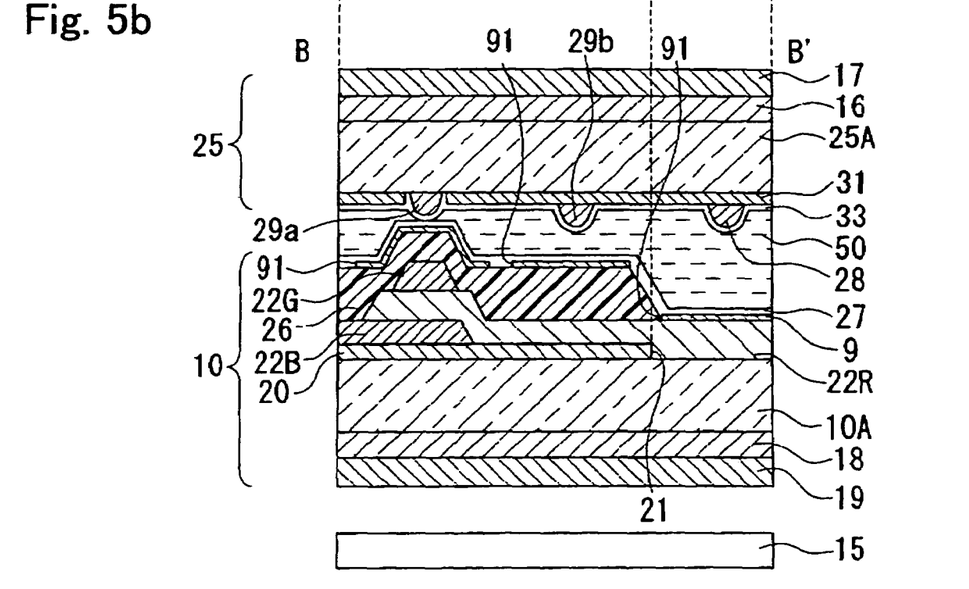
FIG. 5B is a cross-sectional view of main parts of a liquid crystal display device according to a second embodiment.

The liquid crystal display device according to the second embodiment was described above. Structures such as the one illustrated in FIG. 5 may be added. More specifically, the embodiment described above only has the protrusions 28 in the transmissive display area T. In the liquid crystal display device 300 illustrated in FIG. 5, however, protrusions 29b are formed in a reflective display area R to control the direction of tilt of the liquid crystal molecules. The protrusions 29b formed in the reflective display area R are preferably formed so that they have substantially the same height as the protrusions 29a formed in the area between dots. In this way, the problem of the protrusions 29b touching the inner surface of the opposite substrate can be prevented. As a result, the alignment of the liquid crystal molecules can be controlled accurately.

Figure 6A:
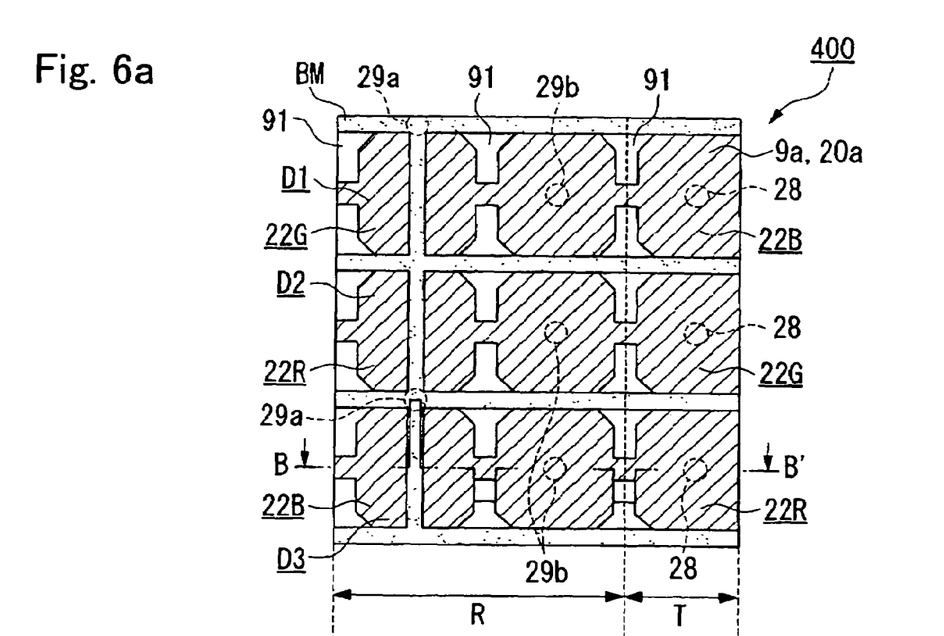
FIG. 6A is an enlarged plan view of main parts of a liquid crystal display device according to a third embodiment.
Figure 6B:
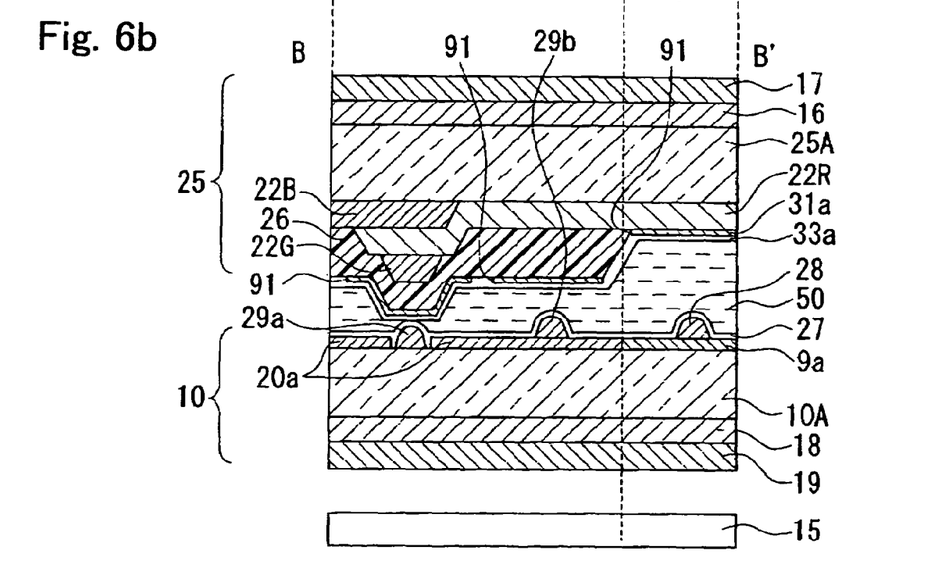
FIG. 6B is a cross-sectional view of main parts of a liquid crystal display device according to a third embodiment.

A liquid crystal display device according to a third embodiment is described by referring to a drawing. FIG. 6 illustrates a liquid crystal display device 400 according to a third embodiment, wherein FIG. 6(a) is a plane view and FIG. 6(b) is cross-sectional view. FIG. 6 is equivalent to FIGS. 4 and 5 illustrating the second embodiment. The basic structure of the liquid crystal display device 400 according to the third embodiment is substantially the same as the liquid crystal display device 200 illustrated in FIG. 4 and the liquid crystal display device 300 illustrated in FIG. 5 except that, in comparison with the second embodiment, a color filter 22 including color layers 22R, 22G, and 22B and an insulating film 26 are disposed on an upper substrate 25 and protrusions 28, 29a, and 29b are formed on a lower substrate 10. Therefore, for the parts in FIG. 6 that are indicated by the same reference numerals that were used in FIGS. 4 and 5 are the same as those in FIGS. 4 and 5 unless otherwise specified and their descriptions are omitted.

As shown in FIG. 6, the liquid crystal display device 400 according to the third embodiment is an active matrix transreflective liquid crystal display device including a thin-film transistor (TFT) as a switching element. The liquid crystal display device 400 includes a liquid crystal layer 50 interposed between a lower substrate (element substrate) 10 and an upper substrate (opposing substrate) 25. The liquid crystal layer 50 is composed of a liquid crystal having molecules that are vertically aligned at an initial alignment state and have negative dielectric anisotropy.

A part of the lower substrate 10 includes a substrate body 10A and a reflective film 20a composed of a metal, such as aluminum or silver, with a high reflectance on the substrate body 10A. The reflective film 20a is formed in a predetermined pattern or, in other words, formed selectively on a reflective display area R. In the area without the reflective film 20a, i.e., a transmissive display area T, transparent electrodes 9a are formed with a predetermined pattern. The reflective film 20a and the transparent electrodes 9a are combined to form a matrix of pixel electrodes.

On the reflective film 20a and the transparent electrodes 9a forming the pixel electrodes, protrusions 28, 29a, and 29b are formed in the transmissive display area T, the reflective display area R, and the area between dots, respectively. The protrusions 28, 29a, and 29b are structured as same as the above-mentioned second embodiment. On the reflective film 20a and the transparent electrodes 9a including the protrusions 28, 29a, and 29b, a homeotropic alignment film 27 is disposed.

On the upper substrate 25, the color filter 22 including an area formed by stacking color layers 22R, 22G, 22B onto the surface of a substrate body 25A is disposed. On the color filter 22, an insulating film 26 functioning as a liquid crystal layer thickness-adjustment layer and a common electrodes 31a covering the entire surface are disposed. Slits 91 are formed on the common electrodes 31a by cutting off portions of the electrodes to generate a distorted electric field. On the common electrodes 31a, a homeotropic alignment film 33a is disposed.

In this embodiment, the black matrix BM composed of the stacked color layers 22R, 22G, 22B is disposed in the area between dots of the color filter 22 between the pixel electrodes. More specifically, in the areas between the dots adjacent to the reflective display area R, the color layers 22R, 22G, and 22B are stacked. The stacked layers display a black color. As a result of stacking the color layers, the thickness of the color filter 22 in the areas between dots becomes larger. The protrusions 29a function to control the thickness of the liquid crystal layer, and the protrusions 28, and 29b function to control the direction of tilt of the liquid crystal molecules turn.

As described above, the liquid crystal display device 400 according to the third embodiment having the color filter 22 including the black matrix composed of the stacked color layers 22R, 22G, 22B in the upper substrate 25 can also have the advantages of the liquid crystal display device 100 according to the first embodiment and the liquid crystal display devices 200 and 300 according to the second embodiment.

Figure 7A:
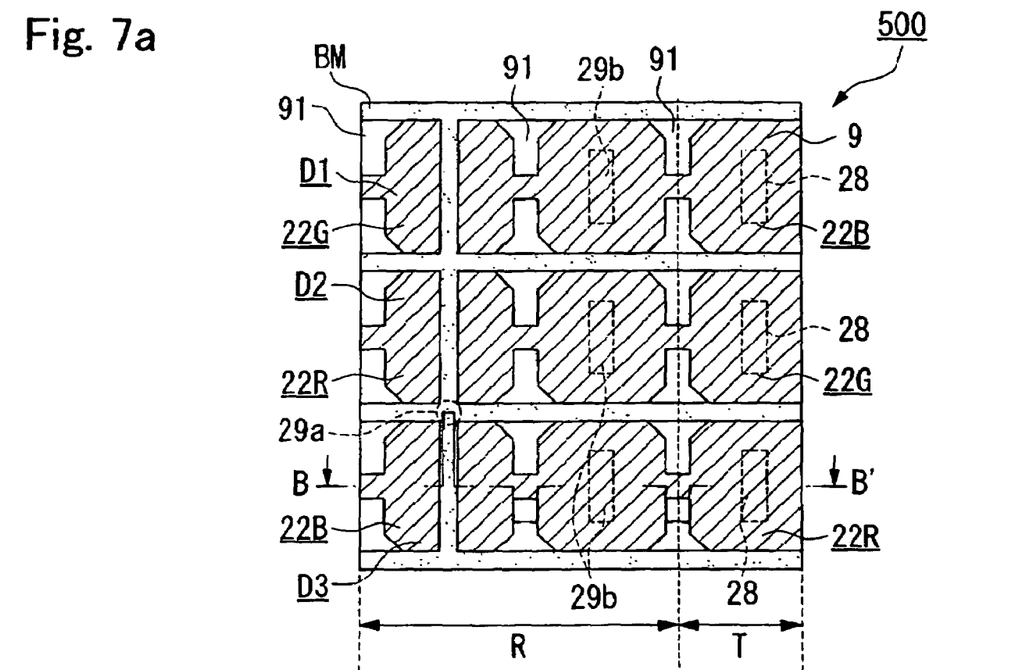
FIG. 7A is an enlarged plan view of main parts of a liquid crystal display device according to a fourth embodiment.
Figure 7B:
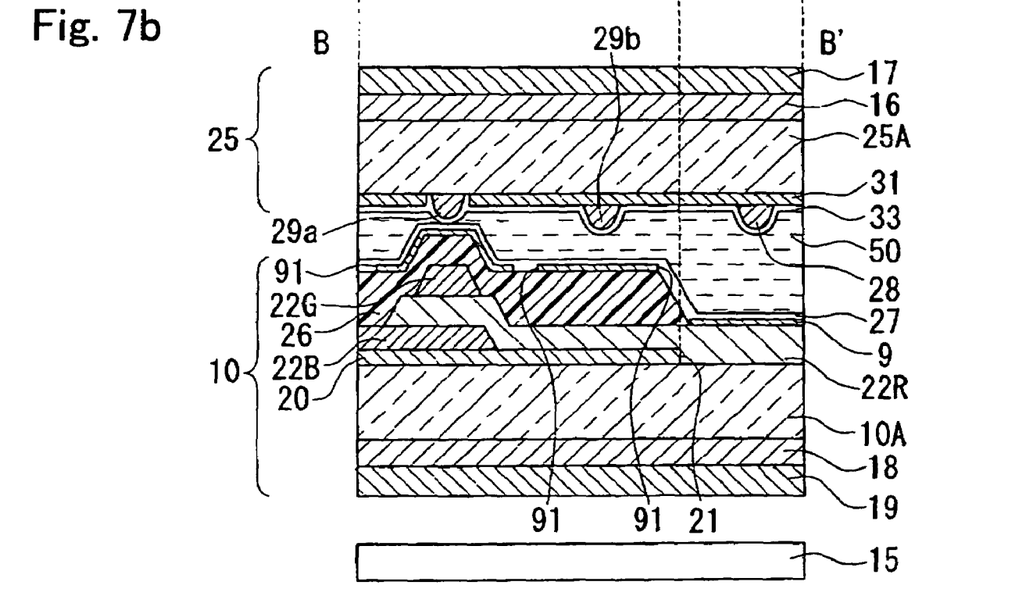
FIG. 7B is a cross-sectional view of main parts of a liquid crystal display device according to a fourth embodiment.

A liquid crystal display device according to a fourth embodiment is described below by referring to a drawing. FIG. 7 illustrates a liquid crystal display device 500 according to a fourth embodiment wherein FIG. 7(*a*) is a plane view and FIG. 7(*b*) is cross-sectional view. FIG. 7 is equivalent to FIGS. 4 and 5 illustrating the second embodiment. The basic structure of the liquid crystal display device 500 according to the fourth embodiment is substantially the same as the liquid crystal display devices 200 and 300 illustrated in FIGS. 4 and 5 except that the shape of the protrusions formed for controlling the alignment of the liquid crystal molecules differs. Therefore, for the parts in FIG. 7 that are indicated by the same reference numerals that were used in FIGS. 4 and 5 are the same as those in FIGS. 4 and 5 unless otherwise specified, and their descriptions are omitted.

As shown in FIG. 7, in the liquid crystal display device 500 according to this embodiment, protrusions 28, and 29*b* for controlling the alignment of the liquid crystal molecules are formed linearly on dot areas, which are display areas. More specifically, in the first to third embodiments, the protrusions for controlling the direction of tilt of the liquid crystal molecules were shaped as cones or polygonal pyramids. In this embodiment, however, projections extending linearly within each of the dots control the direction of tilt of the liquid crystal molecules. In this case, the alignment of the liquid crystal molecules can be controlled even more effectively.

Figure 9A:
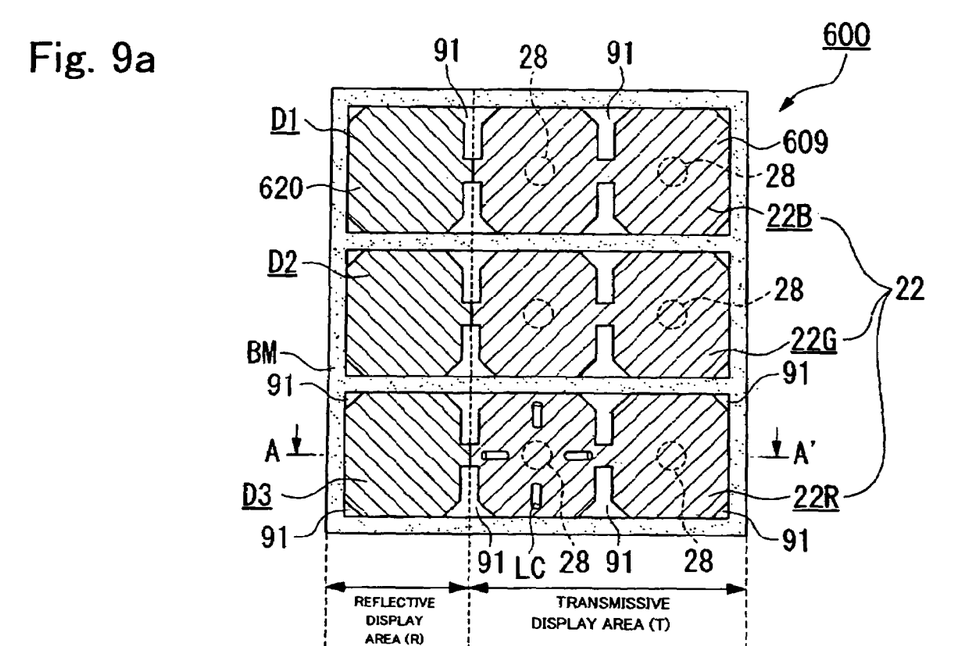
FIG. 9A is an enlarged plan view of main parts of a liquid crystal display device according to a fifth embodiment.
Figure 9B:
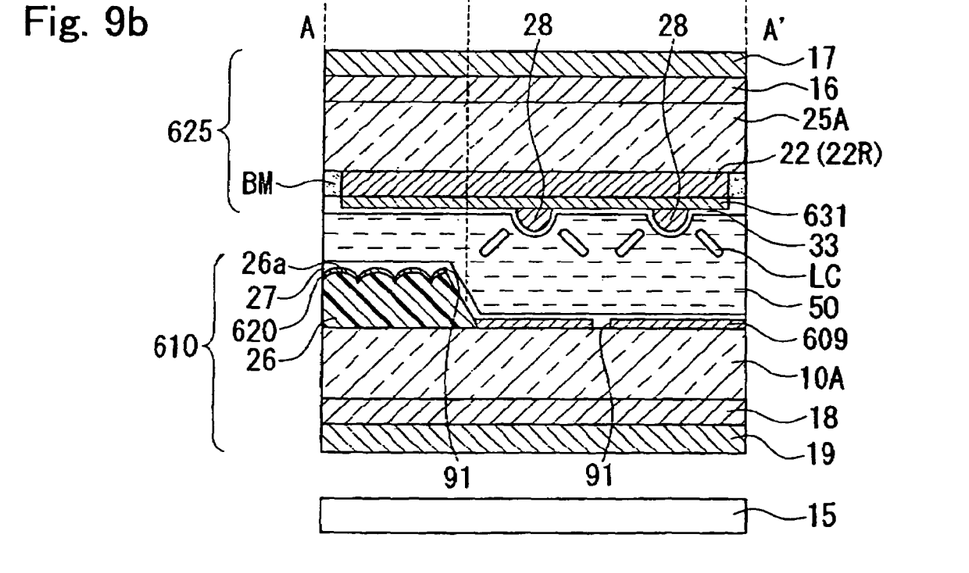
FIG. 9B is a cross-sectional view of main parts of a liquid crystal display device according to a fifth embodiment.

A liquid crystal display device according to a fifth embodiment is described below by referring to a drawing. FIG. 9 illustrates a liquid crystal display device 600 according to a fifth embodiment wherein FIG. 9(*a*) is a plane view and FIG. 9(*b*) is cross-sectional view. FIG. 9 is equivalent to FIG. 3 illustrating the first embodiment. The basic structure of the liquid crystal display device 600 according to the fifth embodiment is substantially the same as the liquid crystal display device 100 illustrated in FIG. 3 except that the structures of a switching element and a pixel electrode differ. Therefore, for the parts in FIG. 9 that are indicated by the same reference numerals that were used in FIG. 3 are the same as those in FIG. 3 unless otherwise specified and their descriptions are omitted.

The liquid crystal display device 600 according to the fifth embodiment is an active matrix transreflective liquid crystal display device including a thin-film transistor (TFT) as a switching element. The liquid crystal display device 600 includes a liquid crystal layer 50 interposed between a lower substrate (element substrate) 610 and an upper substrate (opposing substrate) 625. The liquid crystal layer 50 is composed of a liquid crystal having molecules that are vertically aligned at an initial alignment state and have negative dielectric anisotropy.

A lower substrate 610 includes a substrate body 10A composed of a transparent material, such as quartz or glass. Also, similar to the first embodiment, an insulating film (liquid crystal layer thickness-adjustment layer) 26 is selectively disposed in the area corresponding to a reflective display area R. In this way, the thickness of the liquid crystal layer 50 differs in the reflective display area R and a transmissive display area T. The inner surface of the insulating film 26 has a bumpy surface 26*a*.

On the inner surface of the insulating film 26 having the bumpy surface 26*a*, a reflective film 620 is selectively disposed. The area of the reflective film 620 is the reflective display area R, and the area without the reflective film 620, i.e., the opening on the reflective film 620, is the transmissive display area T. The reflective film 620 is attached to the bumpy surface 26*a* of the reflective film 20 and, accordingly, has a bumpy surface. Consequently, light from outside is prevented from forming reflections in the reflective display and a wide viewing angle is obtained.

On the inner surface of the substrate body 10A in the transmissive display area T, electrodes 609 composed of indium tin oxide are formed. The electrodes 609 are selectively formed in the transmissive display area T and are electrically connected to the reflective films 620 in the reflective display area R (cf. FIG. 9(*a*)). On the inner surface of the lower substrate 610 of this embodiment, the electrodes 609 composed of indium tin oxide are disposed in the transmissive display area T, and the reflective film 620 composed of a metal such as aluminum with a high reflectance is disposed in the reflective display area R. The electrodes 609 and the reflective film 620 form a matrix of pixel electrodes. The pixel electrodes composed of the electrodes 609 and the reflective film 620 have slits 91 on the electrodes 609 in the transmissive display area T and on the border of the electrodes 609 and the reflective film 620.

On the inner surface of the pixel electrodes 609 composed of the electrodes 609 and the reflective film 620, an alignment film 27 composed of polyimide is disposed. The alignment film 27 functions as a homeotropic alignment film for vertically aligning the liquid crystal molecules with respect to the film surface. Alignment processing such as rubbing is not performed on the alignment film 27.

The upper substrate 625 has a substrate body 25A composed of a transparent material such as quartz or glass. On the inner surface of the substrate body 25A, a color filter 22 is disposed. Then, on the entire inner surface of the color filter 22, common electrodes 631 are disposed. On the inner surface of the common electrodes 631, an alignment film 33 composed of a material such as polyimide is disposed. The alignment film 33 functions as a homeotropic alignment film for vertically aligning the liquid crystal molecules relative to the film surface. Alignment processing such as rubbing is not performed on the alignment film 33.

On the inner surface of the common electrode 631, protrusions 28 protruding from the inner surface of the electrodes to the liquid crystal layer 50 are formed in the transmissive display area T. More specifically, as shown in FIG. 9(*a*), the protrusions 28 are formed in the center of the area surrounded by substantially rectangular slits 91. On the inner surface of the substrate body 25A of the upper substrate 625, spacers (not shown in the drawing) formed together with the protrusions 28 are disposed outside the pixel areas. In this embodiment, the height of the protrusions 28 and the spacers are substantially the same. Therefore, both the protrusions 28 and the spacers can be formed from protrusions composed of dielectric material, such as resin in a single photo-process.

In this way, the protrusions 28 in the pixel areas function to control the direction of tilt of the liquid crystal molecules when an electrical voltage is applied so that the molecules align along the inclined surface of the protrusions. The spacers disposed outside the pixel areas function as means for controlling the liquid crystal layer thickness (liquid crystal cell thickness). In this way, the generation of disclination and smear-like unevenness that appear when the liquid crystal display device is viewed from an oblique direction can be prevented or suppressed. In this embodiment, a plurality of protrusions is formed on the substrate opposing the substrate including the insulating film 26. The protrusions in the pixel area are the protrusions 28 for controlling the alignment of the liquid crystal molecules. On the other hand, the protrusions in areas except the pixel areas are spacers for controlling the thickness of the liquid crystal layer. In this way, the production efficiency can be improved. As described in the second embodiment, the protrusions 28 may be formed in the reflective display area R to control the alignment of the liquid crystal molecules.

Subsequently, an embodiment of an electronic apparatus having a liquid crystal display device of an above-mentioned embodiment according to the invention is described.

Figure 8:
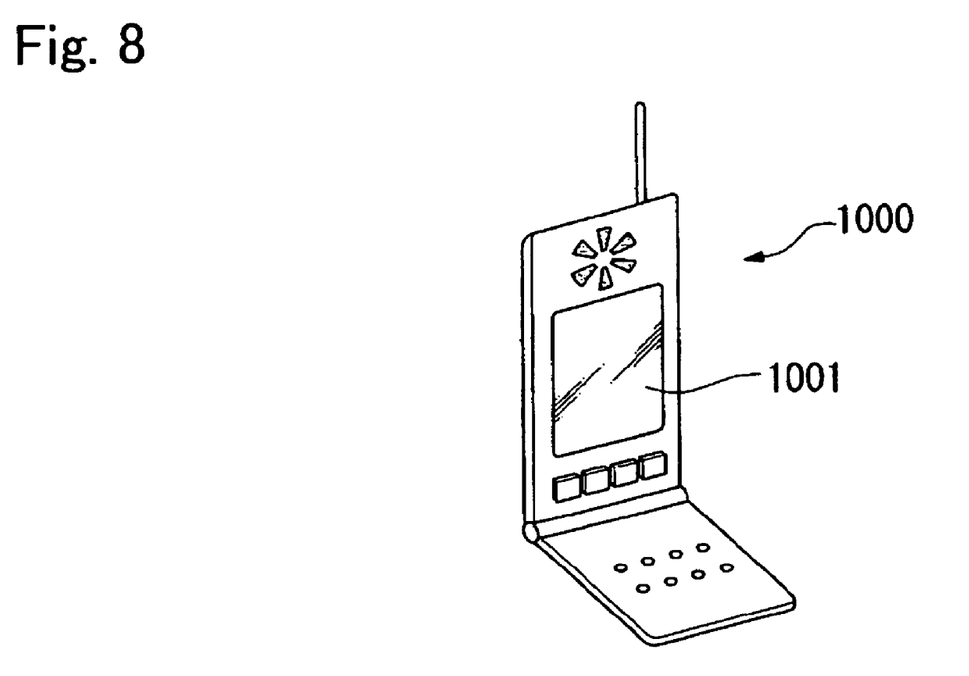
FIG. 8 is a perspective view of an embodiment of an electronic apparatus according to the present invention.

FIG. 8 is a perspective view of an embodiment of a cellular phone. In FIG. 8, the reference numerals 1000 and 1001 indicate a cellular phone body and a display including the liquid crystal display device, respectively. Such an electronic apparatus has a display including the liquid crystal display device according to an above-mentioned embodiment. Therefore, an electronic apparatus including a liquid crystal display with high brightness and contrast and with a wide viewing angle, regardless of the environment, may be produced.

Embodiments of the invention have been described above. The technical scope of the invention, however, is not limited to the above-mentioned embodiments and may be modified in various ways to an extent that does not deviate from the object of the present invention. For example, in the above-mentioned embodiments, the retardation plate was formed of a single plate. The retardation plate, however, may be formed by layering a ½wavelength plate and a ¼wavelength plate. The layered plates function as a wide-range circular polarization plate for achromatizing the black display. The shapes of the protrusions and the electrode slits formed in the embodiments are not limited to the shapes of the above-mentioned embodiments. Any type of protrusion or slit may be acceptable providing that the direction of tilt of the vertically aligned liquid crystal molecules can be controlled.

As described above, while this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A liquid crystal display device, comprising:
a liquid crystal layer interposed between a first substrate and a second substrate; and
a dot area including a transmissive display area and a reflective display area,
the liquid crystal layer being composed of liquid crystal having negative dielectric anisotropy,
a liquid crystal layer thickness-adjustment layer being disposed between the first substrate and the liquid crystal layer that reduces a thickness of the liquid crystal layer in the reflective display area in comparison with a thickness of the liquid crystal layer in the transmissive display area,
a reflective layer disposed in the reflective display area, and
the second substrate without the liquid crystal layer thickness-adjustment layer having protrusions protruding from an inner surface of the second substrate to the liquid crystal layer, the protrusions being formed in both the transmissive display area and the reflective display area, the protrusions in the transmissive display area having a height that is larger than the height of the protrusions in the reflective display area.

2. The liquid crystal display device according to claim 1, the protrusions serving as an alignment controlling device that controls an alignment of the liquid crystal molecules, and the protrusions having inclined surfaces with a slope of a predetermined angle with respect to the inner surface of the second substrate.

3. The liquid crystal display device according to claim 1, electrodes that drive liquid crystal molecules being disposed on inner surface of the first and second substrates and the protrusions being disposed on a surface, adjacent to the liquid crystal layer, of at least the second electrodes.

4. The liquid crystal display device according to claim 3, an alignment film that vertically aligns the liquid crystal molecules being disposed adjacent to the liquid crystal layer over inner surfaces of the protrusions and electrodes.

5. The liquid crystal display device according to claim 1, circular polarization plates that emit circularly polarized light into a liquid crystal layer being disposed on outer surfaces of the first and second substrates.

6. The liquid crystal display device according to claim 1, the first and second substrates being a lower substrate and an upper substrate, a backlight for transmissive display being disposed on an outer surface of the lower substrate and a reflective layer being selectively formed on an inner surface of the lower substrate in the reflective display area.

7. The liquid crystal display device according to claim 1, a color filter layer being disposed on the first substrate surface with the liquid crystal layer thickness-adjustment layer, the color filter including a plurality of color layers stacked in areas between dots.

8. The liquid crystal display device according to claim 7, the liquid crystal layer thickness-adjustment layer being disposed on an inner surface of the color filter layer on the first substrate to cover an area formed by the stacked color layers, and second protrusions protruding from the second substrate to the liquid crystal layer, the second substrate being the substrate without the color filter and the liquid crystal layer thickness-adjustment layer in an area opposing the area formed by the stacked color layers.

9. The liquid crystal display device according to claim 8, the protrusions and second protrusions being composed of a same material.

10. The liquid crystal display device according to claim 9, the first protrusions and the second protrusions having a substantially identical height.

11. An electronic apparatus comprising the liquid crystal display device according to claim 1.

12. The liquid crystal display device according to claim 1, wherein the reflective layer is disposed at a location between the first substrate and the liquid crystal thickness-adjustment layer.

* * * * *